(12) United States Patent
Arlt et al.

(10) Patent No.: US 8,452,633 B2
(45) Date of Patent: May 28, 2013

(54) SYSTEM AND METHOD FOR IMPROVED PROJECT PORTFOLIO MANAGEMENT

(75) Inventors: Mario Arlt, Rocky Hill, NJ (US); Jordi Munoz, Reading (GB)

(73) Assignee: Siemens Corporation, Iselin, NJ (US)

( * ) Notice: Subject to any disclaimer, the term of this patent is extended or adjusted under 35 U.S.C. 154(b) by 1887 days.

(21) Appl. No.: 11/215,244

(22) Filed: Aug. 30, 2005

(65) Prior Publication Data
US 2006/0129439 A1   Jun. 15, 2006

Related U.S. Application Data

(60) Provisional application No. 60/607,537, filed on Sep. 7, 2004.

(51) Int. Cl.
*G06Q 10/00* (2012.01)
(52) U.S. Cl.
USPC ......................... 705/7.23; 705/7.12
(58) Field of Classification Search
USPC ............................... 705/7.12, 7.23
See application file for complete search history.

(56) References Cited

U.S. PATENT DOCUMENTS

| | | | | |
|---|---|---|---|---|
| 5,406,477 | A * | 4/1995 | Harhen ........................... | 703/6 |
| 6,351,734 | B1 * | 2/2002 | Lautzenheiser et al. ..... | 705/7.17 |
| 7,069,097 | B1 * | 6/2006 | Barto et al. ................... | 700/100 |
| 7,801,759 | B1 * | 9/2010 | Adams et al. ................ | 705/7.36 |
| 7,835,929 | B2 * | 11/2010 | Bennett ........................ | 705/7.11 |
| 2003/0088493 | A1 * | 5/2003 | Larsen et al. ................ | 705/36 |
| 2003/0158800 | A1 * | 8/2003 | Pisello et al. ................ | 705/35 |
| 2003/0208429 | A1 * | 11/2003 | Bennett ......................... | 705/36 |
| 2004/0186762 | A1 * | 9/2004 | Beaven et al. ................ | 705/8 |
| 2004/0230468 | A1 * | 11/2004 | King et al. ................... | 705/10 |
| 2005/0043977 | A1 * | 2/2005 | Ahern et al. ................. | 705/7 |
| 2005/0114829 | A1 * | 5/2005 | Robin et al. ................. | 717/101 |
| 2005/0256844 | A1 * | 11/2005 | Cristol ......................... | 707/2 |
| 2006/0047550 | A1 * | 3/2006 | Dineen et al. ................ | 705/8 |

OTHER PUBLICATIONS

"Justifying Strategic Alliances and Partnering", by L. M. Meade; D. H. Liles; and J. Sarkis; Omega, International Journal of Management Sciences; vol. 25, No. 1; pp. 29-42; 1997.*
"A Group Decision Support System for Multiobjective Strategic R&D Portfolio Selection and Resource Allocation using Probabilistic Tradeoffs", by Mehmet G. lyigun; Portland State University, 1995.*
"Multicriteria Financial Portfolio Risk Management for International Projects" by Seung H. Han; James E. Diekmann; Young Lee; and Jong H. Ock. Journal of Construction Engineering and Management, Jun. 2004.*

(Continued)

*Primary Examiner* — Scott L Jarrett
*Assistant Examiner* — Pan Choy

(57) ABSTRACT

A system and method for managing a portfolio or projects is disclosed wherein the relationships between the goals of an organization are determined and a weight is applied to each goal. These weights are indicative of the importance of each goal in achieving another goal. Each project in the organization is assigned a contribution value that indicates the importance of that project in achieving one or more of the organizational goals and strategic impacts of that project to those goals is calculated as a function of the contribution value of the project. This strategic impact is compared to objective criteria, such as the budget allocated to that project, and a determination is made whether the resources allocated to that project should be adjusted as a function of the relationship between this strategic impact and the objective criteria.

26 Claims, 6 Drawing Sheets

OTHER PUBLICATIONS

"A Group Decision Support System for Multiobjective Strategic R&D Portfolio Selection and Resource Allocation using Probabilistic Tradeoffs", by Mehmet G. Iyigun; Portland State University, 1995.*

"Justifying Strategic Alliances and Partnering", by Meade et al., (hereinafter: "Meade"); Omega, International Journal of Management Sciences; vol. 25, No. 1; pp. 29-42; 1997.*

"A Case Study of Resource Management Planning with Multiple Objectives and Projects", by David L. Peterson et al., Springer-Vertag New York Inc., Environmental Management vol. 18, No. 5, pp. 729-742, 1994.*

"A Practical Approach to Portfolio Management", by Kenneth Crow, DRM Associates, 2004. http://web.archive.org/web/20040208015710/http://www.npd-solutions.com/portfolio.html[Jan. 10, 2013 3:14:22 PM].*

"An Integrated Framework for Project Portfolio Selection", by N.P. Archer and F. Ghasemzadeh, International Journal of Project Management, vol. 17, No. 4, pp. 207-216, 1999.*

"Pareto ant Colony Optimization with ILP Preprocessing in Multiobjective Project Portfolio Selection", by K.F. Doerner et al., European Journal of Operational Research, 2004.*

"Heuristic Approaches for Portfolio Optimization", by Manfred Gilli and Evis Kellezi, Kluwer Academic Publishers, 2000.*

"Project Portfolio Management and Managing Multiple Projects: Two Sides of the Same Coin", by Lowell D. Dye et al., Center for Business Practices, PM Solutions, Inc., Proceedings of the Project Management Institute Annual Seminars & Symposium, Sep. 7-16, 2000.*

"Prioritizing Projects to Maximize Return on Investment", by Ann Marsden et al., CC Pace Systems, Inc., 4100 Monument Corner Drive, Suite 400, Fairfax, VA 22030, 2003.*

"Project Portfolio Selection through Decision Support", by F. Ghasemzadeh and N.P. Archer, Decision Support Systems 29, pp. 73-88, Feb. 2000.*

"Making Portfolio Management More Effective", by Robert G. Cooper et al., Stage-Gate International and Product Development Institute Inc., Research Technology Management 2000, vol. 43, No. 2.*

"Formal Method of Decision Analysis Applied to Prioritization of Research and Other Topics", by R.W. Youngblood et al., Information Systems Laboratories, Inc., U.S. Nuclear Regulatory Commission Office of Nuclear Regulator Research, Sep. 2003.*

"R&D Project Selection Using the Analytic Network Process", by Laura M. Meade and Adrien Presley, IEEE Transactions on Engineering Management, vol. 49, No. 1, Feb. 2002.*

L. M. Meade et al., "Justifying Strategic Alliances and Partnering: a Prerequisite for Virtual Enterprising", The University of Texas at Arlington, Fort Worth, TX; Omega, Int. J. Management Science, vol. 25, No. 1, pp. 29-42, 1997.*

"Yes or No: The Two Models for Implementing Project Portfolio Management", pub. Oct. 29, 2004, downloaded from http://www.projectarena.com/solutions/yes_or_No.pdf on Aug. 22, 2005.

Ciliberti R., "Using Project Portfolio Management to Improve Business Value", published Apr. 15, 2005, downloaded from ftp://www6.software.ibm.com/software/developer/library/rational/apr05/ciliberti.pdf on Aug. 23, 2005.

Cruise M., "Portfolio Management—Connecting Projects with Strategy", downloaded from http://www.spmgroup.ca/AssetFactory.aspx?did=37 on Aug. 23, 2005.

Cable J.H. et al, "Project Portfolio Earned Value Management Using Treemaps", Proceedings of Project Management Institute Research Conference, London, Jul. 2004, 13 pages.

* cited by examiner

SYSTEM AND METHOD FOR IMPROVED PROJECT PORTFOLIO MANAGEMENT

This patent application claims the benefit of U.S. Provisional Application No. 60/607,537, filed Sep. 7, 2004, which is hereby incorporated by reference herein in its entirety.

BACKGROUND OF THE INVENTION

A project portfolio is a collection of projects that, in the aggregate determine an organization's strategy in some area, such as the organization's investment strategy. Project portfolio management is a collection of techniques, tools and methodologies that are used to allow the collective analysis of such a collection of projects. While the analysis of the performance of a single project can reveal useful information, the broader study of the portfolio it belongs to can deliver important additional data.

As is well-known, project portfolios have two main attributes, namely alignment and balance. Alignment is the accuracy with which investments in projects reflects a company's strategic goals and is achieved, for example, by aligning the goals of an organization with the projects in which the organization invests. Balance, on the other hand, refers to how projects are managed when multiple desired benefits from one or more projects cannot be obtained simultaneously (e.g., which may occur when projects conflict with each other). For example, striving for balance in a portfolio is an attempt to minimize conflict in identified parameters, such as risk vs. reward, time to market vs. quality of product, etc., that define a project. Any pair of such parameters that are considered trade-offs are typically suitable for a balancing attempt.

The advantages of analyzing a portfolio of projects, rather than individual projects alone, are well known. However, translating the theoretical benefits of alignment of those projects into an actual process for achieving these goals has been difficult to achieve.

SUMMARY OF THE INVENTION

The present inventors have recognized that, for the foregoing reasons, there is a need for a tangible, consistent and repeatable method for assessing a project portfolio and of achieving alignment of the projects in the portfolio with the goals of an organization.

The present invention substantially addresses this need. Specifically, in accordance with one embodiment of the present invention, the relationships between the goals of an organization are determined and a weight is applied to each goal. These weights are indicative of the importance of each goal in achieving another goal. Each project in the organization is assigned a contribution value that indicates the importance of that project in achieving one or more of the organizational goals and strategic impacts of that project to those goals is calculated as a function of the contribution value of the project. This strategic impact is compared to objective criteria, such as the budget allocated to that project, and a determination is made whether the resources allocated to that project should be adjusted as a function of the relationship between this strategic impact and the objective criteria. In another embodiment, if the normalized strategic impact is substantially equal to the normalized budget assigned to the project, then that project is aligned with the goals of the organization.

These and other advantages of the invention will be apparent to those of ordinary skill in the art by reference to the following detailed description and the accompanying drawings.

DETAILED DESCRIPTION

Figure 1:
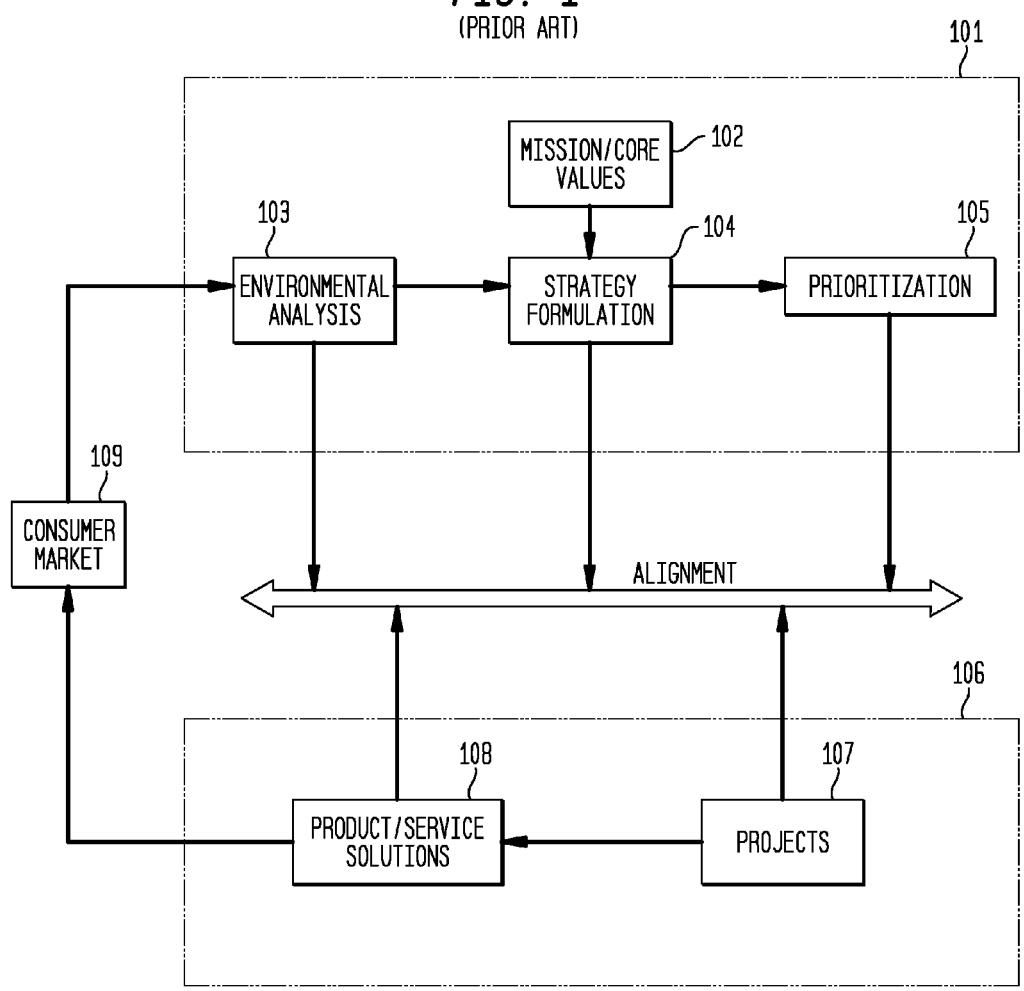
FIG. 1 shows an illustrative prior art diagram of how the goals and strategies of a generic organization relate to one another.

As is well-known, it is highly-desirable to attempt to ensure that the projects of an organization support, or are aligned with, the goals of the organization. Accomplishing such alignment can be difficult because, for example, organizational goals are typically significantly more abstract than the goals and objectives of an individual project. Thus, translating these relatively abstract goals into tangible and concrete projects can be problematic. As a result, frequently, the projects of an organization are not aligned with the goals of an organization and may have only a general and sometimes ambiguous relationship to those goals. However, if such alignment can be accomplished, it can provide a great benefit in that the goals of the organization may be achieved with greater effectiveness and with a greater efficiency of organization resources. Such alignment also allows for a clearer assessment of progress toward the satisfaction of individual goals. These benefits are even greater when entire portfolios of projects, as a whole, are aligned with the organization's goals FIG. 1 shows an illustrative prior art diagram of how the goals and strategies of a generic organization may be formed and how those goals and strategies relate to one another. Specifically, referring to FIG. 1, planning activities in an organization, such as a company, portion of a company or other organization that provides products and services to an internal or external consumer market, can be typically described as either strategic planning activities or operational activities. As shown in FIG. 1, these two levels of planning activities are represented by blocks 101 and 106, respectively. Strategic planning activities consist of such activities as Mission/Core Values identification 102, Environmental Analysis 103, Strategy Formulation 104 and Prioritization 105. In the Mission/Core Values identification process, a company identifies the Mission and Core Values of the organization, which specifies the fundamental principles upon which the organization is based and which should be used to guide business efforts at a high level. This step may also establish very high-level visionary goals that represent the long term objectives of the organization. Once the Mission/Core Values of the organization have been fully developed, then an Environmental Analysis, represented by block 103, is performed. An environmental analysis of an organization is, for example, an assessment of the internal analysis of the operational strengths and weaknesses of the company; an analysis of the external environment in terms of opportunities for and competitive threats to the organization in the consumer market, represented by block 109; and the overall macroeconomic environment describing the external economic environment in which the organization is operating. One skilled in the art will recognize that there are many known methods of analyzing the internal and external business environments of a company.

This environmental analysis, represented by block 103 and the Mission/Core Values of the organization, represented by block 102, are both inputs into the formulation of an organizational strategy, represented by block 104. Once again, developing a high-level organizational strategy is well-known and will not be discussed further herein in detail. However, as one skilled in the art will also recognize, organizational strategies typically are translated into a number of high-level goals that are prioritized by senior management of the company, represented by block 105 in FIG. 1.

In addition to strategic planning activities, an organization will also conduct operational planning activities, represented overall by block 106 in FIG. 1. Specifically, in many typical organizations, projects, represented by block 107, that support the strategies identified in the strategic planning activities of block 101 will be initiated that will lead to products or services, represented by block 108, that are then provided to the consumer market 109.

While the strategic and operational planning methods of FIG. 1 may at first appear routine, a significant unsolved problem has been how to relate the strategic planning efforts of block 101 to the operational projects represented by block 107. The present invention substantially solves this problem. Specifically, in order to align the goals of an organization, the present inventors have recognized that it is desirable to determine the importance of each high level goal and any subsidiary goals relative to one another and to cascade this determination down to each goal established by the organization. Then, once this determination is made, the contribution of each project to each of the organization's goals is determined in order to determine the overall strategic impact of a project to each of the organization's goals. This strategic impact may be normalized to more clearly reflect the strategic importance of each project as it relates to the different levels of goals of the organization.

Figure 2:
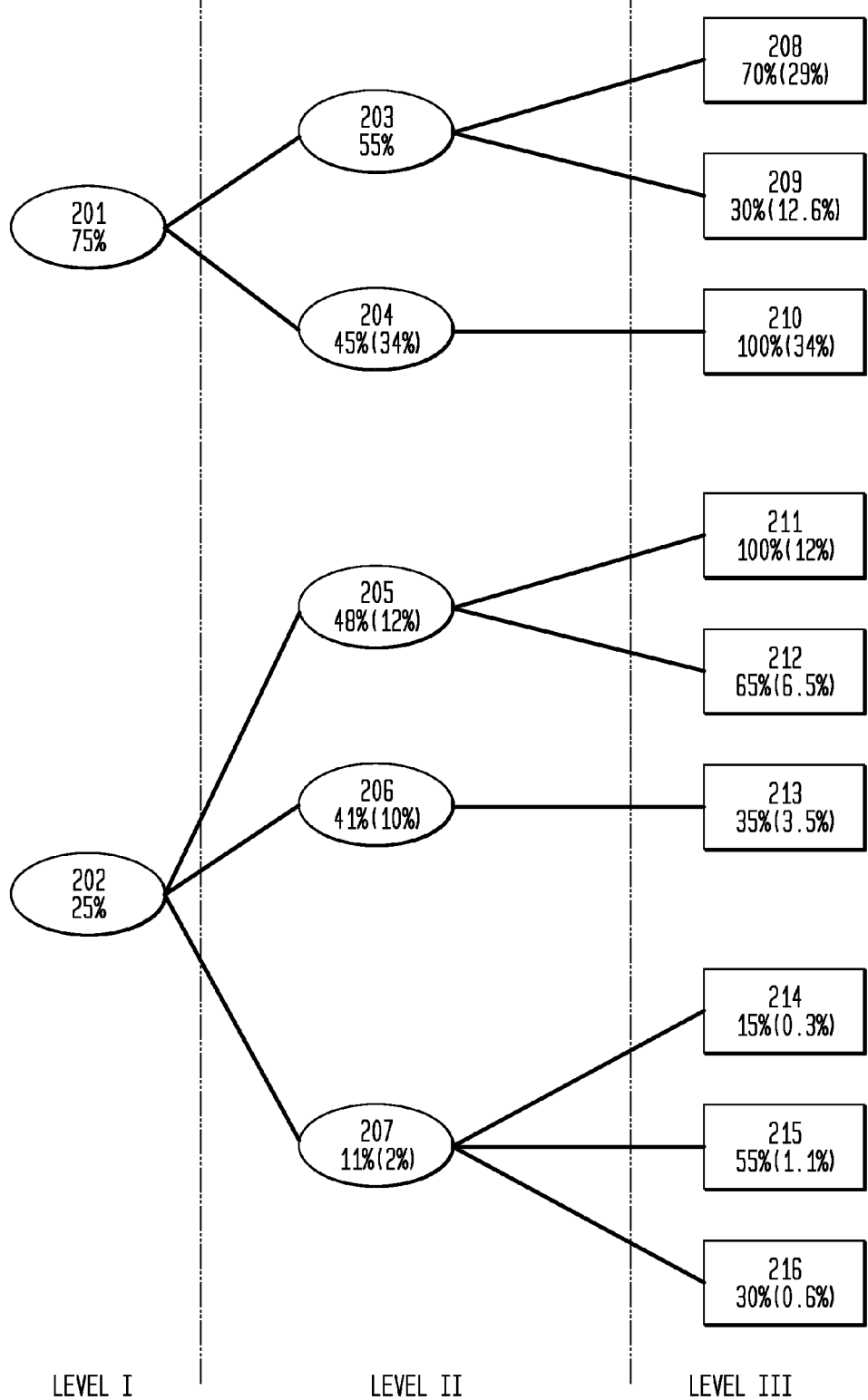
FIG. 2 shows how the importance of the goals of an organization are determined relative to other goals established at different levels of an organization in accordance with the principles of the present invention.

FIG. 2 shows how the importance of the goals of an organization can be determined relative to other goals established at different levels of an organization. Specifically, FIG. 2 shows how multiple levels of goals can be defined, using the above processes, and then related to other goals. More particularly, FIG. 2 shows three levels of goals, levels I, II and III, that represent high level goals (level I goals), intermediate level goals (level II goals) and lower level goals (levels III goals). In this illustrative example, the level I goals consist of two high level, strategic goals 201 and 202 that have been, for example, established by the strategic planning activities as shown in FIG. 1 and discussed herein above. These goals may have also been broken down into intermediate strategic goals, as also discussed above, such as goals 203-207. Finally, these intermediate strategic goals have been further broken down into lower level goals 208-217 that were established, for example, by the operational planning activities also discussed above. In order to create a relationship between these goals, each goal is first linked by relationships represented by lines 217-230 to the higher level goals the lower level goals support. One skilled in the art will recognize that, while lower level goals often support more than one higher level organizational goal, for simplicity the lower level goals shown in FIG. 2 in levels II and III each are shown as supporting one goal each. It will be readily apparent to one skilled in the art how to use the methods describe herein in the case where lower level goals support multiple higher level goals.

Once the relationship between goals has been identified, then the contribution of each goal to each related higher level goal is determined. For example, for each goal starting from the highest level goals, a determination is made as to the subjective weighting of one goal relative to another. There are a number of methods that can be used to accomplish this weighting. For example, a percentage weighting can be directly assigned to each goal relative to their impact on higher level goals. Referring once again to FIG. 2, for example, goals 201 and 202 are the highest level goals and have been assigned, for example a direct weighting of 75% and 25%, respectively, toward the completion of the overall mission of an organization. Alternatively, a pair-wise comparison can be used to determine the relative importance of goals. Typically, however, it is difficult to determine a direct percentage weighting representing the importance of one goal relative to another. Therefore, other methods may be used. For example, a method such as pair-wise ranking can be used illustratively to relate one goal to another in a particular level. Pair-wise comparisons are well known methods that are based on the principle that it is possible to recognize that one criteria, here a goal, is more important than another criteria (goal). In pair-wise ranking, a comparative rank is assigned to each goal, one pair of goals at a time. For example, possible comparative ranks for two different goals, such as goal 201 and 202 could be:

| Rank | Relative Importance |
|------|---------------------|
| 1 | Equally important |
| 3 | Moderately more important |
| 5 | Strongly more important |
| 7 | Very strongly more important |
| 9 | Overwhelmingly more important |

A team of people familiar with the goals and objectives of the organization, and using the tool such as the computer system described herein below, can typically accurately say whether a goal is equally important or more important than another goal and, also, can quantify that relative importance to a certain degree. For example, in the case of goals 201 and 202, the team could have reached the 75%/25% relationship by determining that goal 201 was moderately important relative to goal 202 and, therefore, assigned a ratio of 3:1 for goal 201 relative to goal 202. Using this pair-wise ranking method, goals at each level are ranked for each higher level goal in order to determine the relative importance of the lower level goals in achieving the higher level goals. For example, goals 203 and 204 will be pair-wise ranked to determine their importance in achieving goal 201, goals 208 and 209 will be ranked to determine their importance in achieving goal 203, goals 214-216 will be pair-wise ranked to determine the relative importance of those goals in achieving goal 207, etc. The results for this pair-wise ranking, in percentage terms, is shown as the first percentage directly below each goal. For example, the completion of goal 212 is weighted in importance as 65% of what is needed to complete goal 206. Similarly, goal 213 is weighted as 35% of what is needed to achieve goal 206.

Once this pair-wise ranking, or other ranking, such as direct ranking, has been accomplished for the goals at every level, the relative percentage rankings for each goal and the higher level goals upon which it depends can be combined together in a way such that the direct importance of each sub-goal at every level in achieving the mission of the organization can be seen. This percentage is seen in parentheses directly below each goal. For example, achieving goal 212 is shown as being 6.5% of the relative weight of that goal relative to all level III goals in importance in achieving all goals of the organization, or the mission of the organization. The weighting of 6.5% is achieved by the equation: Overall weight, goal 212=(Relative weight, goal 202×Relative weight, goal 206×Relative weight, goal 212)=25%×41%× 65%=6.5% (approximately). Hence, each goal can be characterized by a weight of importance relative to all goals supporting a particular higher level goal, as well as weight of importance relative to all goals at a particular level of goals.

Figure 3:
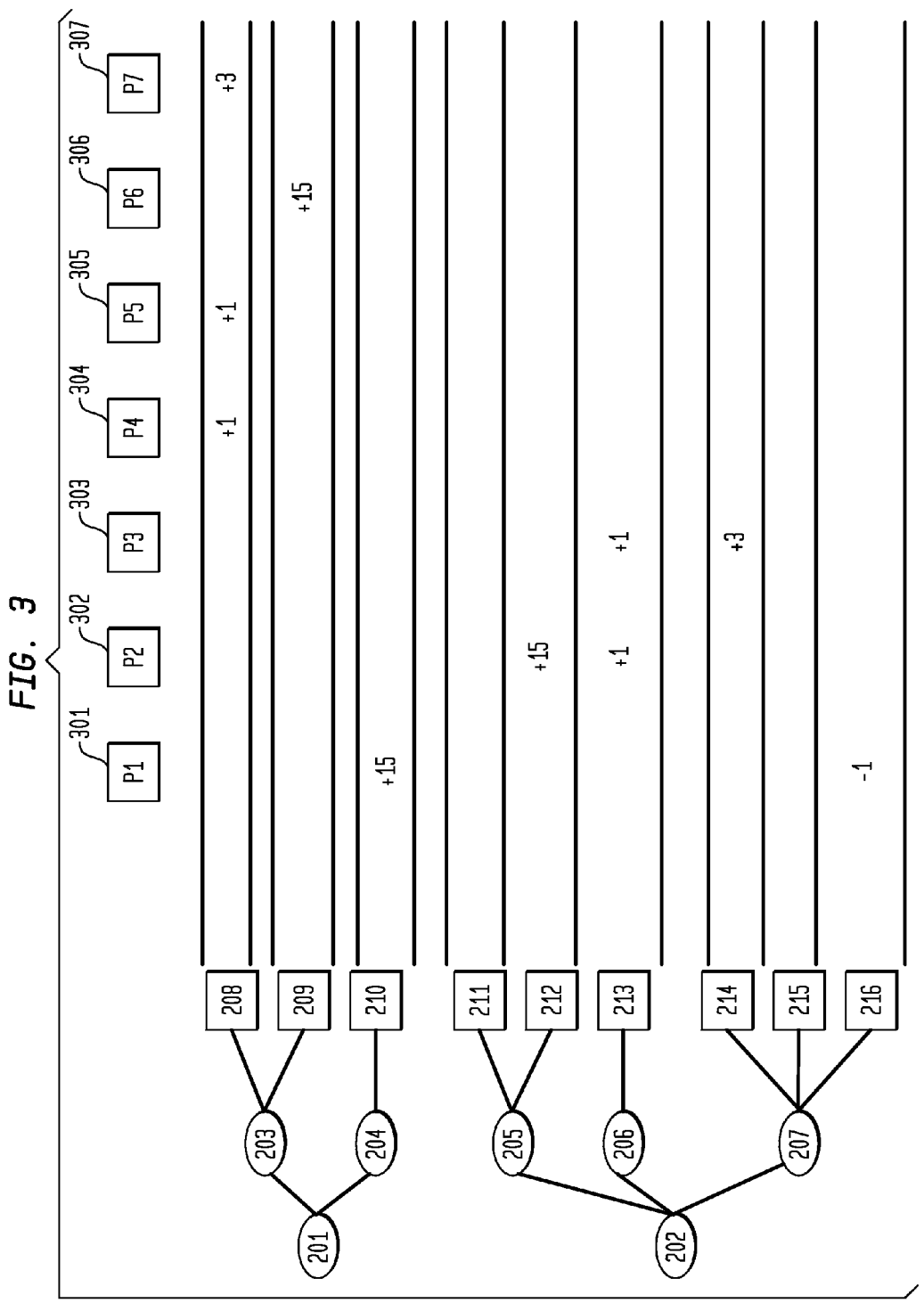
FIG. 3 shows how the strategic impact of each project of an organization can be defined by a contribution value relative to the completion of the goals of FIG. 2.

Once weighting of goals is accomplished, as shown in FIG. 2 and discussed above, the contribution of individual projects to each goal is then determined. FIG. 3 shows a table that is one example of how the contribution of various projects to the goals of FIG. 2 can be illustratively shown. Specifically, projects P1-P7, identified by call out numbers 301-307, respectively, have been identified as supporting one or more of the goals 201-216 identified in FIG. 2. In identifying projects, those projects that contribute to one goal, or more than one goal, should be shown. In the event that a project is identified that does not support at least one goal, then this is indicative of the situation that either a project has been erroneously started or, alternatively, that a goal has been omitted from the list of goals. In this latter case, the list of goals and, possibly, the pair-wise ranking of those goals should be revisited.

In the present example, as shown in FIG. 3, a contribution value is shown representing the contribution of each project to the completion of certain goals. Where no contribution value is shown, that particular project does not contribute either positively or negatively to a goal. Where a positive contribution value is shown, that project contributes at a certain level to the achievement of a goal. And where a negative contribution value is shown, the respective project hinders the achievement of a goal. In this illustrative example, the contribution values are represented as a numerical value, such as +1, +3, +15 or −1. These values represent a subjective numerical assessments corresponding to how much a project contributes to a goal. For example, a +1 contribution value in FIG. 3 represents the subjective assessment that a project contributes in a minor way to the achievement of a goal; a −1 contribution value represents the assessment that a project hinders the achievement of a goal in a minor way; a +3 value represents a significant contribution of a project to a goal; and a +15 value represents a total contribution to achieving a goal (e.g., a goal is achieved if the project is successful). Thus, for example, project P1 301, has a +15 contribution value to goal 210. Thus, if project P1 301 is successfully completed, 100% of goal 210 will be achieved. However, the completion of project P1 301 will hinder in a minor way the completion of goal 216, as indicated by the −1 contribution value assigned to project P1. One skilled in the art will recognize that any contribution value structure, using numbers of any scale, for example, can be used equally advantageously to indicate the contribution level of a project to a goal.

Once the contribution value of each project to a particular goal is determined, then the strategic impact of each project can be identified. Specifically, the strategic impact of each project S[i] can be calculated using the following equation:

$$S[i] = \sum_{j=1}^{G} P[i][j] * G[j] \,\forall\, i = 1 \ldots P \quad \text{Equation 1}$$

where P[i][j] is the contribution of project i to goal j; G[j] is the strategic weight of goal j; G is the total number of goals; and P is the total number of projects. Using this formula, a strategic impact for each project can be determined. Specifically, the strategic impacts have been calculated as 0.96, 1.01, 0.12, 0.29, 1.31, 1.89 and 0.87 for projects P1-P7, respectively. While these values in themselves can provide guidance as to how to the relative strategic impact of one project compared to another, the normalized strategic impact $\overline{S}[i]$ for each project can be calculated to more clearly see the relative strategic impact of the various projects using the equation:

$$\overline{S}[i] = \frac{S[i]}{\max S} \quad \text{Equation 2}$$

where $\overline{S}[i]$ is the normalized strategic impact, S[i] is the strategic impact for project i; and max S is the maximum value of S[i] of all projects combined. The normalized strategic impact for each goal better indicates the relative strategic impact of each project on a scale from 0 to 1.

Figure 4:
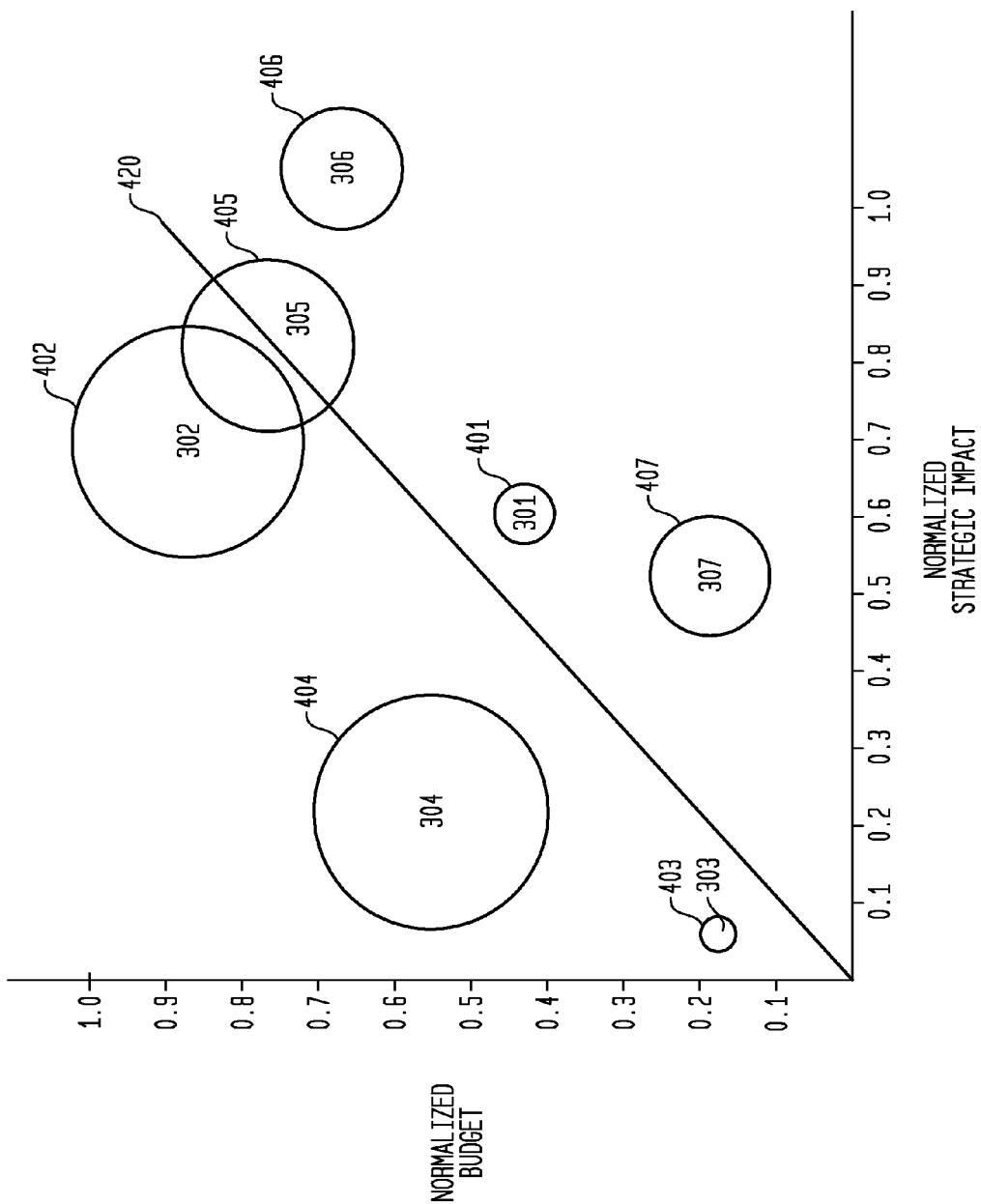
FIG. 4 shows a chart of the normalized strategic impact of an organization's projects as a function of the normalized budget allocated to those projects.

Finally, in order to determine the alignment of goals with respect to projects, it is desirable to determine if the strategic importance of each project, as determined above, is in line with the objective organizational importance assigned to the project. In particular, in one illustrative embodiment, the normalized strategic importance determined above is compared to the normalized budget assigned to each project. FIG. 4 shows one illustrative chart, here a bubble chart, that is useful for showing the relationship between the normalized strategic impact of a project and objective organizational importance attributed to that project, represented by the normalized budget assigned to that project. Specifically, referring to FIG. 4, each project 301-307 is drawn as a circular area referred to herein as a bubble. For each project, the center point of the circular area is first plotted as a function of, on the vertical axis 401, the normalized budget assigned to the respective project and, on the horizontal axis 402, the normalized strategic impact of the project. Then, a circle of radius r is plotted about that point that is a function of the relative resources assigned to each project. By plotting each project in this fashion, the normalized investment, the total resources, and the strategic importance of each project can be easily determined. Thus, a determination can be made whether the normalized investment corresponds, or is aligned, with the strategic importance attributed to each project.

Referring to FIG. 4, a project is defined herein as being perfectly aligned with the objective organizational criteria (budget) if the center of the bubble corresponding to that project lies directly on line 420. For example, project 305 is centered on line 420, indicating that the normalized budget equals the normalized strategic impact of the project. Thus, project 305 is referred to herein as being aligned with the goals of the organization. On the other hand, project 304 represented by bubble 404, has a relatively large investment, as shown by the large radius of bubble 404 and a modest normalized budget, approximately 0.5. However, the strategic importance assigned to this project, as determined hereinabove, is a relatively low 0.15. Thus, project 304 is referred to herein as being "out of alignment" with the goals of the organization. Specifically, bubble 404 is significantly above line 420 on the graph which indicates that, relative to the strategic importance of project 304, an excessive budget has been allocated to that project. On the other hand, project 306 has a slightly smaller budget allocation, yet is the most strategically important project as calculated above. Thus, project 306 is also referred to as being out of alignment with the goals of the organization. However, in this case, the budget allocated to project 306 is too low. Thus, in order to bring projects 304 and 306 into alignment with organizational goals, a lower budget should be allocated to project 304 and a higher budget to project 306, for example, in order to align the corresponding bubbles with line 420. By plotting each of the projects as bubbles and determining whether or not each of those bubbles is aligned with line 420, appropriate adjustments to the budget allocation and/or strategic impact of those projects can be made.

Figure 5:
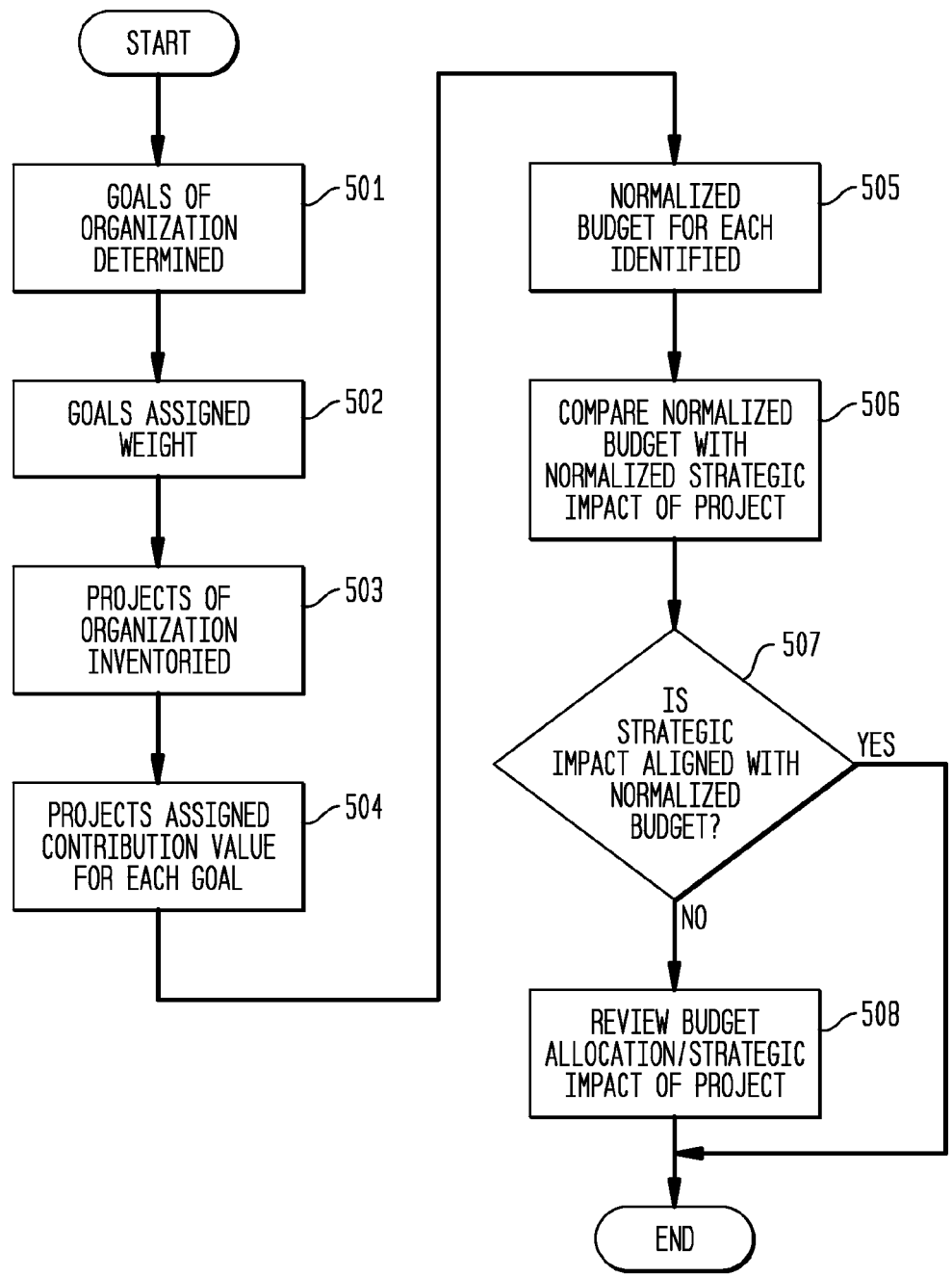
FIG. 5 shows the steps of one illustrative method in accordance with the principles of the present invention.

FIG. 5 is a flow chart showing the illustrative steps of one embodiment of the present invention. Specifically, at step 501, the goals of an organization are determined. Next, at step 502, those goals are each assigned a weight according to their importance to achieving higher level goals or the mission of the organization. Then, at step 503, the projects within the organization are inventoried. At step 504, the projects are each assigned a contribution value for each goal indicating the contribution that successful completion of a particular project will have toward achieving each of the identified goals. Next, at step 505, the normalized budget for each project is identified. At step 506, a comparison is made, using for example a bubble chart, between the normalized budget and the normalized strategic impact of each project. At step 507, a determination is made whether the strategic impact of each project is substantially aligned with the normalized budget assigned to that project relative to other projects. If a project is not aligned, then at step 508 a review of the budget allocation to the project and/or the strategic impact determination is conducted. In this fashion, a portfolio of projects can be aligned with the goals of the organization relative to one another.

Figure 6:
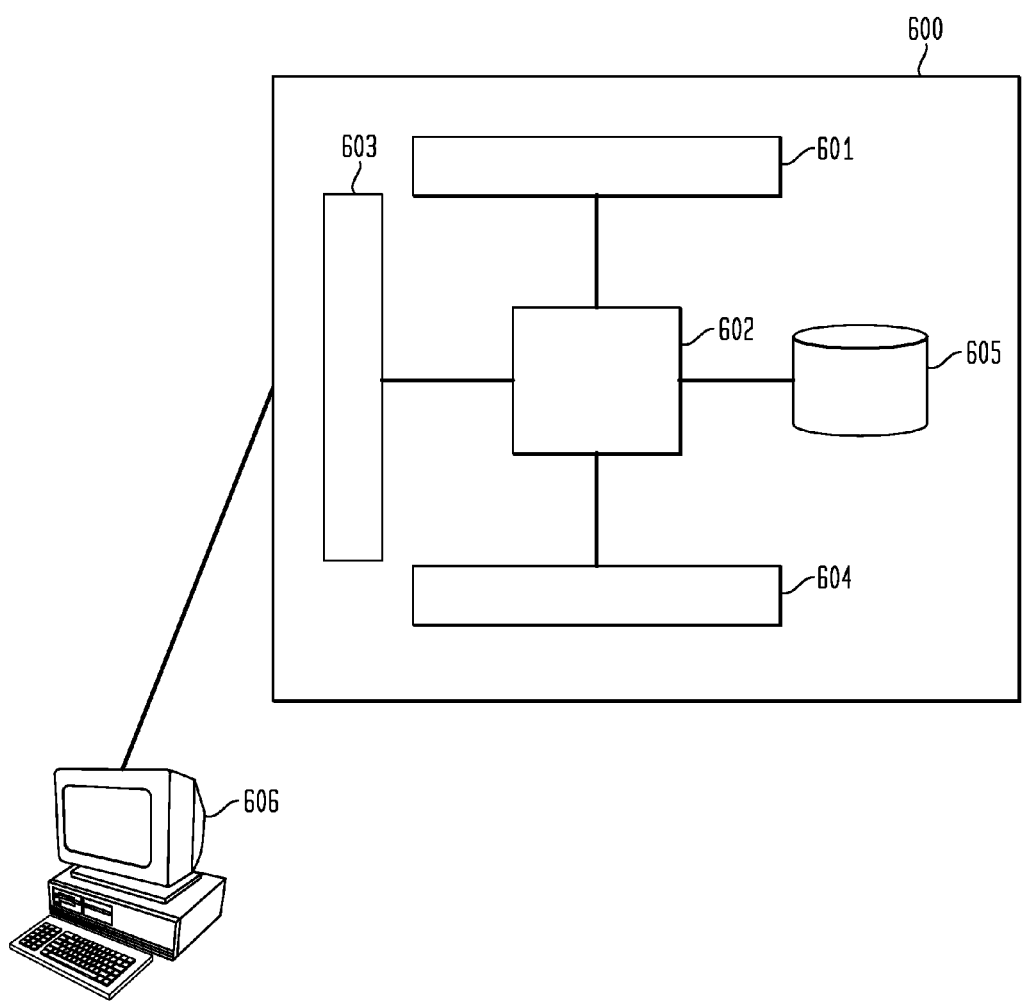
FIG. 6 shows a schematic diagram of computer adapted to perform the steps of an illustrative computer program in accordance with the principles of the present invention.

One skilled in the art will recognize that the steps of FIG. 5 associated with determining the alignment of projects relative to other projects in a portfolio with the goals of an organization, such as that discussed above, may be implemented on a programmable computer adapted to perform the steps of an alignment system computer program to perform those calculations. Referring to FIG. 6, such an alignment system 600 may be implemented on any suitable computer adapted to receive, store and transmit data. Specifically, illustrative alignment system 600 may have, for example, a processor 602 (or multiple processors) which controls the overall operation of the alignment system 600. Such operation is defined by computer program instructions stored in a memory 603 and executed by processor 602. The memory 603 may be any type of computer readable medium, including without limitation electronic, magnetic, or optical media. Further, while one memory unit 603 is shown in FIG. 6, it is to be understood that memory unit 603 could comprise multiple memory units, with such memory units comprising any type of memory. Memory unit 603 illustratively comprises the one or more data structures containing the data represented in FIGS. 1-5 and discussed herein above. For example, such data structures may contain the weighting of each goal relative to one another represented by the percentages of FIG. 2, the contribution values represented in FIG. 3, and may also contain values indicative of the relationship between the normalized budget, normalized strategic impact, and the resource allocation to various projects as represented by the bubbles of FIG. 4. One skilled in the art will recognize that other data elements discussed herein above may also be contained in such, or similar, data structures. Alignment system 600 also comprises illustrative modem 601 and network interface 604. Alignment system 600 also illustratively comprises a storage medium, such as a computer hard disk drive 605 for storing, for example, data and computer programs adapted for use in accordance with the principles of the present invention as described hereinabove. Finally, alignment system 600 also illustratively comprises one or more input/output devices, represented in FIG. 6 as terminal 606, for allowing interaction with, for example, a technician or database administrator. One skilled in the art will recognize that alignment system 600 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method for aligning a plurality of projects with a plurality of organizational goals, said method comprising:

storing, in a memory, a relationship between a first goal in said plurality of organizational goals and a second goal in said plurality of organizational goals;

storing, in the memory, a weight for said first goal in said plurality of organizational goals, said weight indicative of an importance of said first goal in achieving said second goal in said plurality of organizational goals;

storing, in the memory, a contribution value for a first project relative to said first goal, said contribution value indicative of the importance of said first project in achieving said first goal relative to said second goal;

determining, by a computer processor, a strategic impact of said first project as a function of said contribution value of said first project relative to each of the plurality of projects;

comparing said strategic impact of said first project on a first objective criteria indicative of the importance of said first project relative to the importance of each of the plurality of projects; and generating a resource allocation to said first project as a function of a relationship of said strategic impact to said objective criteria, wherein said first objective criteria comprises an amount of money assigned to said first project, wherein said strategic impact of said first project is a function of said weight of said first goal and the contribution value of said first project, and wherein said strategic impact of said first project is calculated according to an expression:

$$S[i] = \sum_{j=1}^{G} P[i][j] * G[j] \ \forall \ i = 1 \ldots P$$

where S[i] is a strategic impact of a project i; P[i][j] is a contribution value of project i to goal j; G[j] is a weight of goal j; G is a total number of goals; and P is a total number of projects.

2. The computer implemented method of claim 1 wherein said weight is a function of a weight of a third goal in said plurality of organizational goals.

3. The computer implemented method of claim 1 wherein said step of storing in the memory a weight for said first goal comprises storing a weight directly assigned to said first goal relative to said second goal.

4. The computer implemented method of claim 1 wherein said step of storing in the memory a weight for said first goal comprises storing a weight assigned by performing a pair-wise ranking for respective goals in said plurality of organizational goals at each level in a hierarchy of goal levels.

5. The computer implemented method of claim 1 wherein said step of storing in the memory a contribution value comprises storing a subjective value assigned to said first project, said subjective value indicative of the strategic impact of said first project on said first goal.

6. The computer implemented method of claim 5 wherein said strategic impact of said first project represents a portion of said first goal that would be accomplished if said first project is successfully completed.

7. The computer implemented method of claim 1 wherein said strategic impact of said first project is calculated according to a normalized expression:

$$\overline{S}\ [i] = \frac{S\ [i]}{\max S}$$

where S[i] is a normalized strategic impact of the project i, S[i] is the strategic impact of the project i; and max S is a maximum value of S[i] of all projects combined.

8. The computer implemented method of claim 7 wherein said normalized strategic impact of said first project is between 0 and 1.

9. The computer implemented method of claim 1 wherein said first objective criteria comprises a normalized budget amount assigned to said first project, said normalized budget amount indicative of a first budget amount allocated to said first project relative to a second budget amount allocated to said second project.

10. Apparatus for aligning a plurality of projects with a plurality of organizational goals, said apparatus comprising:
   means for storing a relationship between a first goal in said plurality of organizational goals and a second goal in said plurality of organizational goals;
   means for storing a weight for said first goal in said plurality of organizational goals, said weight indicative of an importance of said first goal in achieving said second goal in said plurality of organizational goals;
   means for storing a contribution value for a first project relative to said first goal, said contribution value indicative of the importance of said first project in achieving said first goal relative to said second goal;
   means for determining a strategic impact of said first project as a function of said contribution value of said first project relative to each of the plurality of projects;
   means for comparing said strategic impact of said first project on a first objective criteria indicative of the importance of said first project relative to the importance of each of the plurality of projects; and
   means for generating a resource allocation to said first project as a function of a relationship of said strategic impact to said objective criteria, wherein said first objective criteria comprises an amount of money assigned to said first project,
   wherein said strategic impact of said first project is a function of said weight of said first goal and the contribution value of said first project, and wherein said strategic impact of said first project is calculated according to an expression:

$$S\ [i] = \sum_{j=1}^{G} P\ [i][j] * G\ [j] \ \forall\ i = 1\ \dots\ P$$

where S[i] is a strategic impact of a project i; P[i][j] is a contribution value of project i to goal j; G[j] is a weight of goal j; G is a total number of goals; and P is the total number of projects.

11. The apparatus of claim 10 wherein said weight is a function of a weight of a third goal in said plurality of organizational goals.

12. The apparatus of claim 10 wherein said means for storing a weight for said first goal comprises means for storing a weight directly assigned to said first goal relative to said second goal.

13. The apparatus of claim 10 wherein said means for storing a weight for said first goal comprises means for storing a weight assigned by performing a pair wise ranking for respective goals in said plurality of organizational goals at each level in a hierarchy of goal levels.

14. The apparatus of claim 10 wherein said means for storing a contribution value comprises means for storing a subjective value assigned to said first project, said subjective value indicative of the strategic impact of said first project on said first goal.

15. The apparatus of claim 14 wherein said strategic impact of said first project represents a portion of said first goal that would be accomplished if said first project is successfully completed.

16. The apparatus of claim 10 wherein said strategic impact of said first project is calculated according to a normalized expression:

$$\overline{S}\ [i] = \frac{S\ [i]}{\max S}$$

where S[i] is a normalized strategic impact of the project i, S[i] is the strategic impact of the project i; and max S is a maximum value of S[i] of all projects combined.

17. The apparatus of claim 16 wherein said normalized strategic impact of said first project is between 0 and 1.

18. The apparatus of claim 10 wherein said first objective criteria comprises a normalized budget amount assigned to said first project, said normalized budget amount indicative of a first budget amount allocated to said first project relative to a second budget amount allocated to said second project.

19. An apparatus comprising:
   a memory;
   a computer processor communicatively coupled to the memory, the computer processor configured to execute computer program instructions, which, when executed on the computer processor, cause the computer processor to perform operations comprising:

storing, in the memory, a first data structure comprising a relationship between a first goal in said plurality of organizational goals and a second goal in said plurality of organizational goals;

storing, in the memory, a second data structure comprising a weight for said first goal in said plurality of organizational goals, said weight indicative of an importance of said first goal in achieving said second goal in said plurality of organizational goals;

storing, in the memory, a third data structure comprising a contribution value for a first project relative to said first goal, said contribution value indicative of the importance of said first project in achieving said first goal relative to said second goal; and determining a strategic impact of said first project as a function of said contribution value of said first project relative to each of the plurality of projects;

comparing said strategic impact of said first project on a first objective criteria indicative of the importance of said first project relative to the importance of each of the plurality of projects; and generating an allocation of resources to said first project as a function of a relationship of said strategic impact to said objective criteria, wherein said first objective criteria comprises an amount of money assigned to said first project, wherein said strategic impact of said first project is a function of said weight of said first goal and the contribution value of said first project, and wherein said step of determining a strategic impact of said first project is calculated according to an expression:

$$S[i] = \sum_{j=1}^{G} P[i][j] * G[j] \; \forall \; i = 1 \ldots P$$

where S[i] is a strategic impact of a project i; P[i][j] is a contribution value of project i to goal j; G[j] is a weight of goal j; G is a total number of goals; and P is a total number of projects.

20. The apparatus of claim 19 wherein said weight is a function of a weight of a third goal in said plurality of organizational goals.

21. The apparatus of claim 19 wherein said weight for said first goal comprises a weight directly assigned to said first goal relative to said second goal.

22. The apparatus of claim 19 wherein said strategic impact of said first project represents a portion of said first goal that would be accomplished if said first project is successfully completed.

23. The apparatus of claim 19 wherein said step of determining a strategic impact of said first project is calculated according to a normalized expression:

$$\overline{S}[i] = \frac{S[i]}{\max S}$$

where $\overline{S}[i]$ is a normalized strategic impact of the project i, S[i] is the strategic impact of the project i; and max S is a maximum value of S[i] of all projects combined.

24. The apparatus of claim 23 wherein said normalized strategic impact of said first project is between 0 and 1.

25. The apparatus of claim 19 wherein said first objective criteria comprises a normalized budget amount assigned to said first project, said normalized budget amount indicative of a first budget amount allocated to said first project relative to a second budget amount allocated to said second project.

26. The computer implemented method of claim 7, wherein said first objective criteria comprises a normalized budget amount assigned to said first project, said normalized budget amount indicative of a first budget amount allocated to said first project relative to a second budget amount allocated to said second project, wherein generating a resource allocation to said first project as a function of a relationship of said strategic impact to said objective criteria comprises:

generating a resource allocation such that said normalized strategic impact is equal to said normalized budget amount assigned to said first project in order to align said first project with the plurality of organizational goals.

* * * * *